United States Patent
Nir

(10) Patent No.: US 12,294,474 B2
(45) Date of Patent: May 6, 2025

(54) SIGNALING COMPRESSION AND DECOMPRESSION ASSOCIATED WITH A PARTIALLY UNROLLED DECISION FEEDBACK EQUALIZER (DFE)

(71) Applicant: Cadence Design Systems, Inc., San Jose, CA (US)

(72) Inventor: Ehud Nir, Etobicoke (CA)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 18/142,977

(22) Filed: May 3, 2023

(65) Prior Publication Data

US 2023/0362041 A1    Nov. 9, 2023

Related U.S. Application Data

(60) Provisional application No. 63/339,387, filed on May 6, 2022.

(51) Int. Cl.
  *H04L 25/03*    (2006.01)
  *H04L 27/06*    (2006.01)
  *H04L 25/49*    (2006.01)

(52) U.S. Cl.
  CPC ........ *H04L 25/03057* (2013.01); *H04L 27/06* (2013.01); *H04L 25/4917* (2013.01)

(58) Field of Classification Search
  CPC ......... H04L 25/03006; H04L 25/03019; H04L 25/03057; H04L 25/03254; H04L 25/03267; H04L 25/03286; H04L 25/03949; H04L 25/03885; H04L 25/03949; H04L 25/4917; H04L 27/06

USPC .......................... 375/232, 233; 708/322, 323
  See application file for complete search history.

(56) References Cited

U.S. PATENT DOCUMENTS

| | | | |
|---|---|---|---|
| 9,742,597 B1 * | 8/2017 | Chang | H04L 25/03057 |
| 10,263,663 B2 | 4/2019 | Kiran et al. | |
| 10,756,931 B2 | 8/2020 | Musah et al. | |
| 10,904,044 B2 | 1/2021 | Palusa et al. | |
| 2013/0243070 A1 * | 9/2013 | Ito | H04L 27/01 375/233 |
| 2015/0256363 A1 * | 9/2015 | Shvydun | H04L 25/4917 375/233 |
| 2017/0171006 A1 * | 6/2017 | Baecher | H04L 27/02 |

(Continued)

OTHER PUBLICATIONS

Kiran, Shiva et al., "A 52-GB/s ADC-Based PAM-4 Receiver With Comparator-Assisted 2-bith/Stage SAR ADC and Partially Unrolled DFE in 65-nm CMOS", IEEE Journal of Solid-State Circuits, vol. 54, No. 3, Mar. 2019, pp. 659-671. 13 pages.

*Primary Examiner* — Young T. Tse
(74) *Attorney, Agent, or Firm* — Mark H. Whittenberger; Holland & Knight LLP

(57) ABSTRACT

Technologies for signaling compression inside a partially unrolled decision feedback equalizer (DFE) are described. The signaling compression associated with partially unrolled DFE results in multiplexers selecting a 1-bit output value from one of two 1-bit input values, which are decoding the actual multi-bit candidate levels and transforming the selected 1-bit output value to a multi-bit sliced value by adding to it a pointer value of a pulse-amplitude modulation (PAM) level. The signaling compression reduces the power and area of an N-tap DFE, where N is a positive integer.

13 Claims, 7 Drawing Sheets

(56) References Cited

U.S. PATENT DOCUMENTS

2017/0180002 A1\* 6/2017 Kiran ................... H04B 1/0007
2020/0252247 A1\* 8/2020 Palusa ............... H04L 25/03878

\* cited by examiner

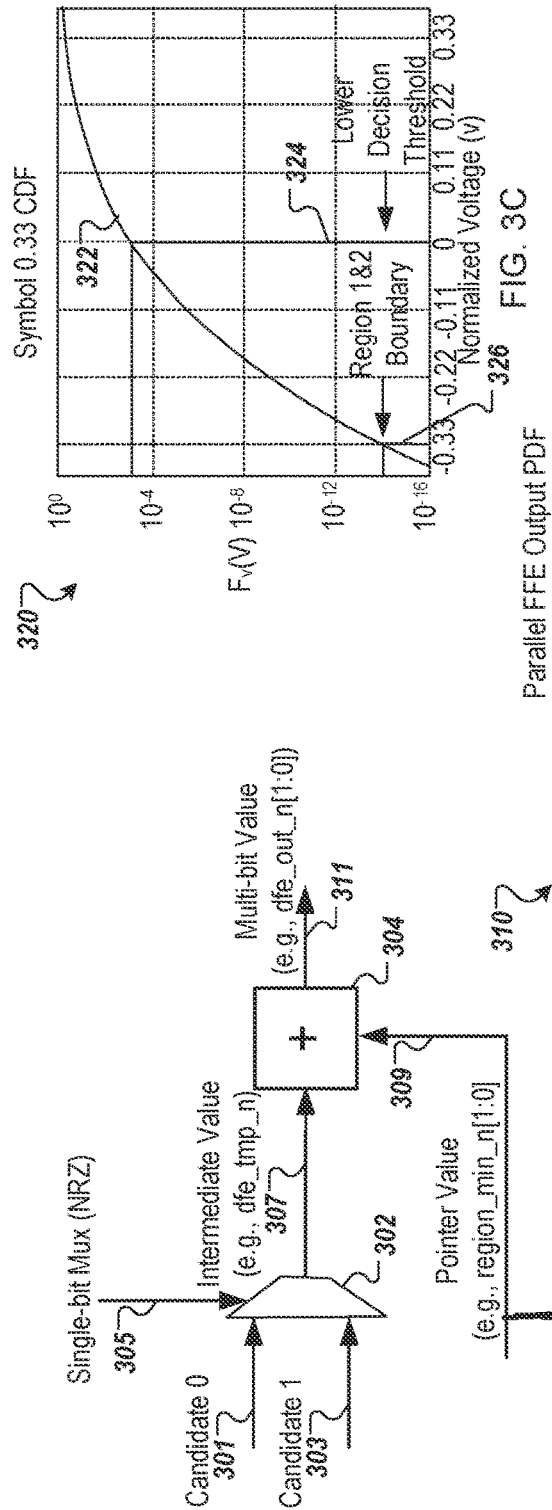
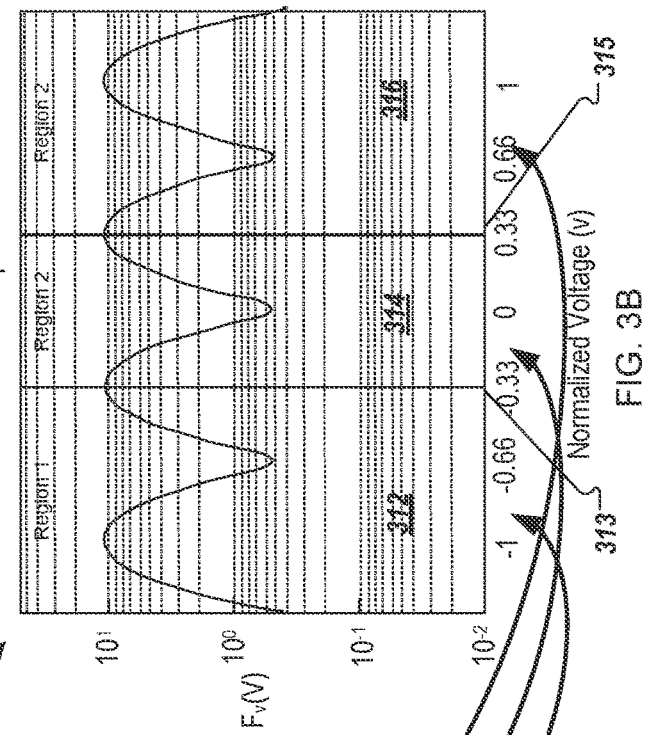
FIG. 3A
FIG. 3B
FIG. 3C

SIGNALING COMPRESSION AND DECOMPRESSION ASSOCIATED WITH A PARTIALLY UNROLLED DECISION FEEDBACK EQUALIZER (DFE)

RELATED APPLICATIONS

This application claims the benefit of U.S. Provisional Application No. 63/339,387, filed May 6, 2022, the entire contents of which are incorporated herein by reference.

BACKGROUND

A decision feedback equalizer (DFE) is a non-linear equalizer that uses a decision of a previous symbol to remove intersymbol interference (ISI) in a current symbol. For example, an incoming signal can be sampled by a sampling circuit, and samples of the incoming signal can be fed into a feed-forward equalizer (FFE) that produces an equalized signal. The equalized signal can be fed into a DFE that removes ISI from the current symbol. Implementing the DFE in a circuit introduces a critical timing path. For example, a DFE with a single-level slicer and one tap would introduce a critical timing path of one over the baud rate (e.g., T=1/Baud).

DFEs can be used in serializer/deserializer (SERDES) receivers to remove post-cursor ISI without amplifying the noise. In an analog-to-digital converter (ADC) based SERDES, the DFE is implemented in a parallel fashion and applied on a number of samples in parallel in a word clock domain. A pre-calculation stage with look-ahead and unrolling techniques is used in the parallel DFE to shorten a critical timing path to meet the circuit timing requirements. The pre-calculation stage calculates and slices an equalized signal based on speculations of previous symbols. In particular, the look-ahead technique selects a speculated sliced symbol of a current sample based on a speculated sliced symbol of a previous sample, and the unrolling technique selects the actual sliced symbol. However, as the number of pulse-amplitude modulation (PAM) levels and the number of taps of the DFE increase, the number of possibilities for the look-ahead and unrolling techniques also increase exponentially. The increased number of possibilities increases a count of multiplexers needed for the look-ahead and unrolling techniques, which increases the circuit area and the amount of power consumed by the DFE.

BRIEF DESCRIPTION OF THE DRAWINGS

The present disclosure is illustrated by way of example, and not by way of limitation, in the figures of the accompanying drawings.

FIG. 3A is a block diagram of a look-ahead multiplexer and an adder that adds a pointer value to transform a single-bit value into a multi-bit output value according to a PAM region level, according to at least one embodiment.

FIG. 3B is a graph of a probability density function (PDF) of a parallel FFE output across three regions according to at least one embodiment.

FIG. 3C is a graph of a cumulative distribution function (CDF) of a given symbol according to at least one embodiment.

DETAILED DESCRIPTION

Figure 1A:
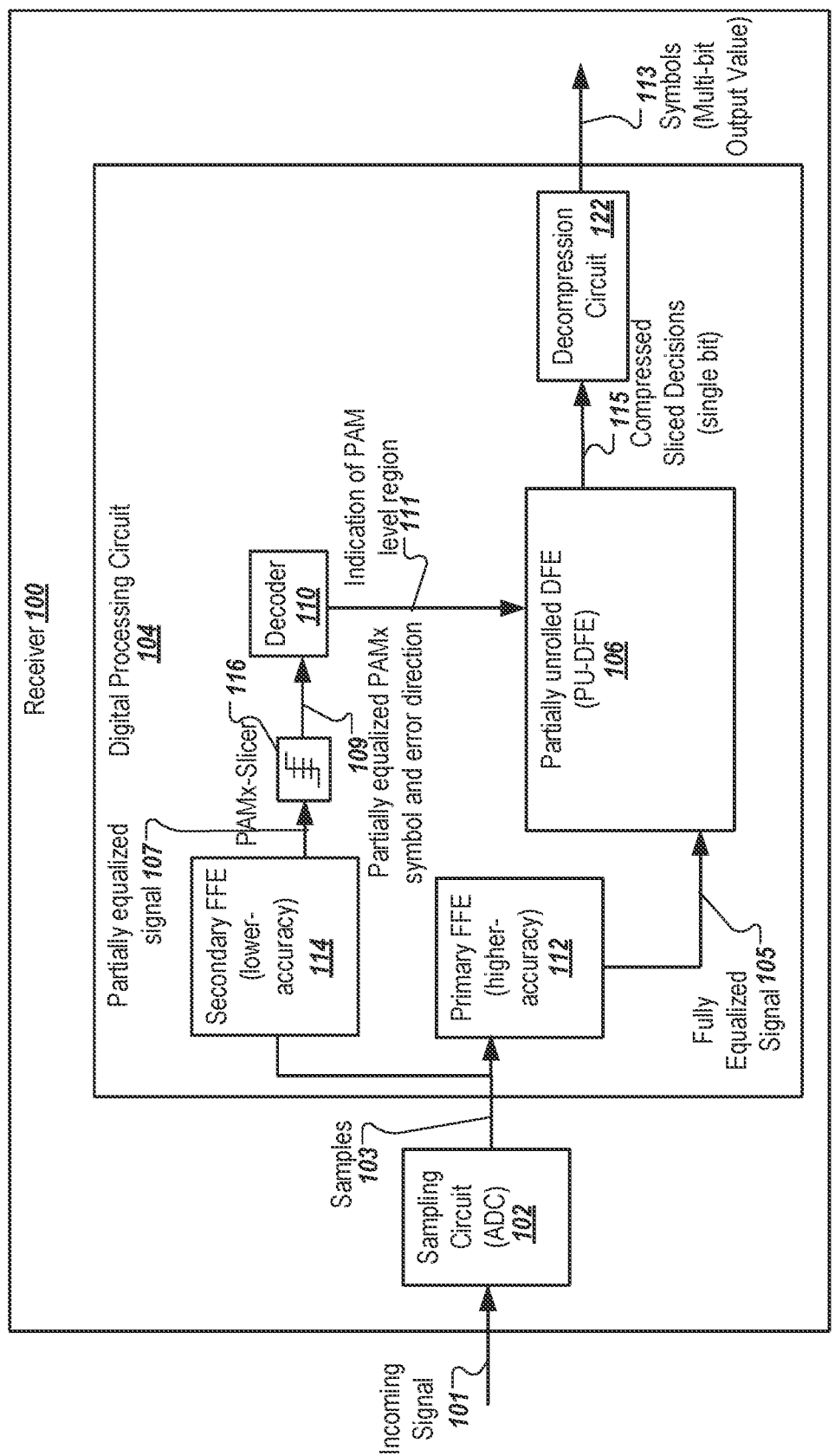
FIG. 1A is a block diagram of a receiver with two FFEs, a decoder circuit, and a decompression circuit, associated with a partially unrolled DFE according to at least one embodiment.

The following description sets forth numerous specific details, such as examples of specific systems, components, methods, etc., to provide a good understanding of several embodiments of the present disclosure. However, it will be apparent to one skilled in the art that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described above, the number of multiplexers used for look-ahead and unrolling techniques increases exponentially as the number of PAM levels and the number of taps of the DFE increases. Aspects of the present disclosure overcome these challenges and others by providing signaling compression that only multiplexes 2×1 bit symbols instead of multiplexing 2×2 bit symbols. Aspects of the present disclosure provide a partially unrolled DFE where the look-ahead and unrolling multiplexers (hereinafter look-ahead multiplexers) select a 1-bit output between one of two 1-bit inputs, which are decoding the actual multi-bit candidate levels, and a decompression circuit transforms the selected 1-bit output to a multi-bit sliced value by adding to it a pointer associated with a PAM level region in which the actual symbol can exist. Loop unrolling is a technique that is used in non-return-to-zero (NRZ) signaling or PAM to remove the slicer from a timing loop by pre-computing the two candidates before a look-ahead multiplexer. When parallel processing architectures are used in digital signal processing (DSP), the critical path of the timing loop is further relaxed by using a look-ahead technique on some of the candidates (using look-ahead multiplexers controlled by previous decisions). As set forth above, the area of the DFE increases exponentially when switching into multi-level signaling (e.g., PAM4) and even more with multiple taps in the DFE.

Aspects of the present disclosure provide circuitry that converts PAMx signaling to binary signaling (e.g., NRZ signaling) associated with a partially unrolled DFE. Aspects of the present disclosure can provide a first equalizer, followed by a slicer and a decoder, to provide a lower-accuracy symbol and a region where the actual symbol can exist, convert PAMx signaling to binary signaling, equalizing the binary signaling with the partially unrolled DFE, and transform the binary signal to multi-bit symbols using a pointer value associated with the region, thereby reducing the number of multiplexers and slicers in a parallel DFE without significant loss in performance due to the statistical nature of the distribution of the received signal. Aspects of the present disclosure, instead of using the full PAM level in the pre-calculation stage (look-ahead multiplexers), the two candidates in the identified region can be mapped to a single bit NRZ signal by storing a pointer value associated with the region (e.g., a minimum symbol in the region). For example, for the PAM4 scheme, the two candidates in three regions can be mapped as set forth in Table 1.

TABLE 1

| Region | Candidates (Binary) | Min Symbol |
|--------|---------------------|------------|
| 1 | 00, 01 | 00 |
| 2 | 01, 10 | 01 |
| 3 | 10, 11 | 10 |

Table 1

By storing this information for every sample, the speculation driven into the look-ahead multiplexers can be coded with 1 bit: "0" for a candidate equal to the minimum symbol and "1" for the minimum symbol plus one (min+1). Storing this information leads to significant savings in the multiplexers needed for the look-ahead and unrolling techniques; instead of multiplexing 2×2 bit symbols, 2×1 bit symbols need to be multiplex. Aspects of the present disclosure can be used in systems with any number of taps in the various equalizers (FFE, DFE) and any number of PAM levels used in the PAM scheme. Aspects of the present disclosure can re-utilize hardware used for a partially unrolled DFE with one tap and PAM4 signaling and NRZ signaling as the look-ahead and unrolling block with this technique is the same as the block that is used for a fully unrolled DFE with one tap for NRZ signaling. The aspects of the present disclosure can allow the reuse of the same hardware block in SERDES that supports both types of signaling instead of designing two blocks, each optimized for either signaling method.

FIG. 1A is a block diagram of a receiver 100 with two FFEs, a decoder, and a decompression circuit, associated with a partially unrolled DFE according to at least one embodiment. In the illustrated embodiment, receiver 100 includes a sampling circuit 102 and a digital processing circuit 104. The sampling circuit 102 can be an analog-to-digital converter (ADC). The sampling circuit 102 can generate samples 103 of an incoming signal 101. The incoming signal 101 can be modulated according to the PAM scheme (e.g., three-level PAM (PAM3), 4-level PAM (PAM4), 8-level PAM (PAM8), 16-level PAM (PAM16), etc.). In another embodiment, the incoming signal 101 can be modulated according to QAMx. The incoming signal 101 can be an NRZ signal or a return-to-zero (RZ) code. The NRZ signal can appear as raw binary bits without any coding, where binary 1 maps to logic-level high and binary 0 maps to logic-level low. The digital processing circuit 104 is operatively coupled to the sampling circuit 102. The samples 103 can be stored in a buffer accessible by different components of the digital processing circuit 104 as described herein. The digital processing circuit 104 provides a partially unrolled decision feedback equalizer (DFE) 106, where the look-ahead multiplexers have two 1-bit inputs and one 1-bit output if the partially unrolled DFE 106 has one tap. It should be noted that if more taps are used in the partially unrolled DFE 106, the number of inputs is equal to $2^n$, where n is the number of taps. In at least one embodiment, some of the hardware of the digital processing circuit 104 can be shared for both PAM4 and NRZ signaling with a selectable reference slicer.

As illustrated, the digital processing circuit 104 includes the partially unrolled DFE 106, a primary feed-forward equalizer (FFE) 112, a secondary FFE 114, a decoder 110, and a decompression circuit 122. The partially unrolled DFE 106 includes multiple multiplexers, each having two 1-bit inputs and one 1-bit output if the partially unrolled DFE 106 has one tap. It should be noted that if more taps are used in the partially unrolled DFE 106, the number of inputs will be equal to $2^n$, where n is the number of taps. A PAMx slicer 116 is coupled to an output of the secondary FFE 114 and receives a partially equalized signal 107. The PAMx slicer 116 generates a partially equalized symbol and an error direction 109. Based on the output of the PAMx slicer 116, the decoder 110 can determine a PAM level region where an actual symbol is located. The decoder 110 can output an indication of the PAM level region 111. In particular, the decoder 110 can determine a region minimum and select a threshold for the slicers of the partially unrolled DFE 106 to be the threshold between the two levels in the region. The slicers of the partially unrolled DFE 106 (not illustrated in FIG. 1A) output compressed candidates. The look-ahead multiplexers of the partially unrolled DFE 106 determine the compressed look-ahead candidates, and the unrolling multiplexers of the partially unrolled DFE 106 select the compressed sliced decision 115 (single bit). In particular, the partially unrolled DFE 106 can determine a compressed sliced decision based on the compressed candidates. The compressed sliced decision 115 is a one 1-bit output value that needs to be decompressed by the decompression circuit 122. The decompression circuit 122 can transform or decompress the one 1-bit output value into a multi-bit output value by adding a pointer value associated with the PAM level region within the PAM scheme. The pointer value can be a minimum symbol value of the respective region.

As illustrated, the primary FFE 112 receives the samples 103 from the sampling circuit 102. In ADC-based receivers, a digital FFE can be used in connection with a DFE to equalize the channel and recover the data. The primary FFE 112 can receive the samples 103 and output a primary FFE output signal 105 (labeled fully equalized signal) associated with a current sample (n). The secondary FFE 114 receives the samples 103 and outputs a secondary FFE output signal 107 (labeled partially equalized signal). The PAMx slicer 116 receives the secondary FFE output signal 107 and outputs a partial decision based on a partially equalized signal 107 from the secondary FFE 114. The secondary FFE 114 outputs a partially equalized signal for both a previous sample and a current sample. The previous sample can be used to select a candidate in the loop unrolling phase, and the current sample can be used for compression (decoding) and decompression. The partial decision includes a partially equalized PAMx symbol 109 (2 bits) and an error direction (e.g., sign bit). The decoder 110 can use the partially equalized symbol and error direction to determine an indication 111 of a partially equalized symbol region 111 (e.g., log (PAM) bits). In particular, the partially equalized sliced PAM4 symbols of the incoming signal 101 are used to reduce the amount of candidate symbols to two. Together with the indication 111 of the partially equalized symbol region, these are used to compress the pre-computed speculations to 1 bit at the input of the partially unrolled DFE 106. The partially unrolled DFE 106 outputs the final compressed sliced decisions 115 to the decompression circuit 122 that transforms or decompresses the final compressed sliced decisions 115 into a decision 133 of the current sample using a delayed version of the indication of the PAM level region (e.g., 111) and the primary FFE output signal 105. A delay element that is equal to the internal delay of the partially unrolled DFE 106 can be used to accommodate timing.

In at least one embodiment, the decoder 110 is coupled to an output of a first FFE (e.g., 114) that outputs a partially equalized sliced symbol 107 (partial decisions), as compared to a second FFE (e.g., 112) that outputs a fully equalized sliced symbol. The PAMx slicer 116 outputs the partially equalized symbol and error direction (e.g., 109) based on the partial decisions described above. In at least one embodiment, the first FFE can include fewer taps than the second FFE. For example, the first FFE can include five taps, and the second FFE can include fifteen taps. The first FEE and PAMx slicer can output a partially equalized FFE output decision, while the second FFE can output a main FFE output decision on a current sample (also referred to as the primary FFE output decision as compared to the partially equalized or secondary FFE output decision on the previous sample). These two decisions can be fed into the partially unrolled DFE 106. In at least one embodiment, a memory element disposed within the partially unrolled DFE can store an indication 111 of the PAM level region in which the actual symbol is located, and the partially unrolled DFE 106 includes a pre-calculation stage 120 to determine the candidates of equalized signals 117. The memory element can store an indication of the PAM level region in which the actual symbol is located and map two compressed candidates in the PAM level region to a single-bit signal associated with a current sample. The candidates of equalized signals 117 can be sliced by single-level slicers 124 to provide compressed candidates 123, 125, 127 to the compressed domain 126 that determines the final compressed sliced decision 115 using the candidates. The decoder 110 can provide the indication of the PAM level region and a threshold selected for the PAM level region to the single-level slicers 124 to map two symbol candidates (based on partially equalized PAMx symbol 109) in the PAM level region to a single-bit signal (e.g., 1-bit output value) (e.g., single-bit NRZ signal) associated with the current sample (n). In at least one embodiment, each compressed candidate can be a minimum (coded as a zero) or minimum plus one (coded as a one), depending on the result of the single-level slicer 124.

The DFE 106 can be implemented in a parallel fashion to process a specified number of samples. In at least one embodiment, the PAM scheme includes two or more levels, and the partially unrolled DFE 106 includes one or more taps. In another embodiment, the PAM scheme includes four levels (e.g., PAM4), and the partially unrolled DFE 106 includes one tap. In at least one embodiment, the partially unrolled DFE 106 is a parallel DFE with a specified timing path to process P samples in parallel in a word clock domain, where P is a positive integer greater than two.

In at least one embodiment, a parallel DFE includes a pre-calculation stage, a look-ahead stage, and an unrolling stage to meet a specified timing path. It should be noted that single-level slicers come after the adders in the pre-calculation stage. The look-ahead stage can select a compressed look-ahead sliced symbol of a current sample based on the region of partially equalized sliced symbols of the previous sample. The unrolling stage can select an actual sliced symbol of the current sample (compressed sliced decisions 115). The candidates for the adders in the pre-calculation stage are selected based on the partially equalized symbols 109. In at least one embodiment, the pre-calculation stage 118 can calculate and slice an equalized signal based on speculations of $N^K$ possibilities, where N is a number of PAM levels in the PAM scheme, and K is a number of taps of the parallel DFE. In a further embodiment, the parallel DFE is coupled to the secondary FFE 114 and the PAMx slicer 116. The secondary FFE 114 outputs the partially equalized PAMx symbol 109 of the previous sample and the indication of the PAM level region in which the actual sliced symbol is located.

In at least one embodiment, the PU-DFE includes a number of multiplexers. The multiplexers can include look-ahead 2:1 multiplexers with two inputs and one output. The two inputs of the look-ahead multiplexers can be the two candidates being selected. In at least one embodiment, the compression allows the use of half the number of multiplexers in any chosen topology of uncompressed partially-unrolled DFEs. In at least one embodiment, the number of the multiplexer (look-ahead multiplexers) is set forth in the following equation (1):

$$1 * P * \left( \frac{(L-1) * 2^N}{2} + \sum_{i=0}^{N-1} 2^i \right),$$

where P represents a number of parallel lines, L represents a look-ahead factor, and N represents a number of taps of the partially unrolled DFE 106. Each of the multiplexers can output a single-bit signal, which is transformed by the decompression circuit 122 into the multi-bit output value for the decision 133 of the current sample. Thus, the partially unrolled DFE 106 outputs a decision 133 of the current sample (n) using the partial decisions (e.g., 109, 111) and the primary FFE output signal 105 (fully equalized signal).

Figure 1B:
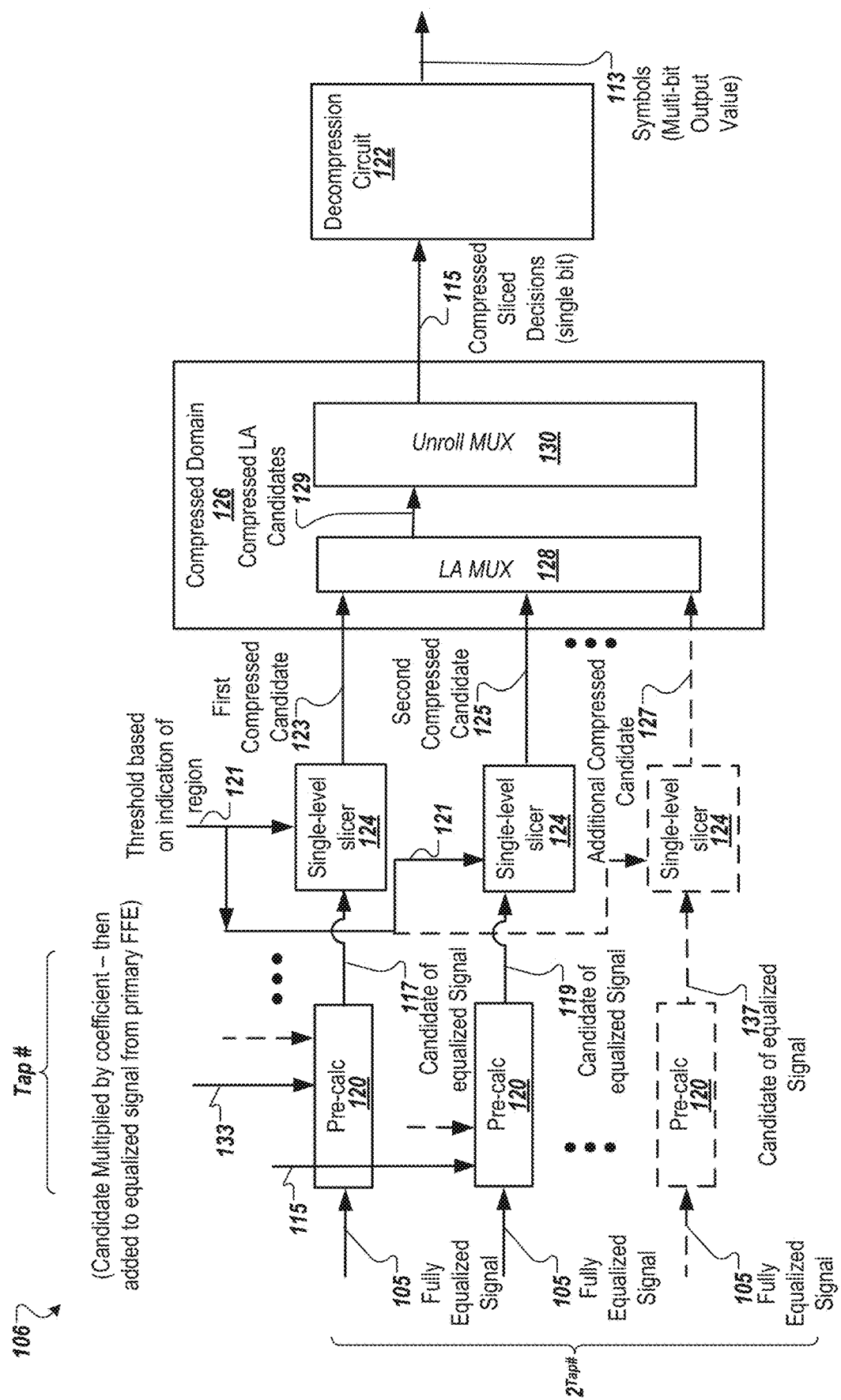
FIG. 1B is a block diagram of the partially unrolled DFE and decompression circuit of FIG. 1A according to at least one embodiment.

FIG. 1B is a block diagram of the partially unrolled DFE 106 and decompression circuit 122 of FIG. 1A according to at least one embodiment. The partially unrolled DFE 106 includes a pre-calculation stage with multiple pre-calculation blocks 120. In the pre-calculation blocks 120, the candidates are multiplied by coefficients (weight values), then added to the equalized signal 105 from the primary FFE 112. The number of pre-calculation blocks 120 is equal to two to the power of the number of taps ($2^{Taps \#}$). The number of inputs into the pre-calculation block is equal to the number of taps (Tap #). For example, in a single-tap partially unrolled DFE 200, there are two pre-calculation blocks 120, where a first calculation block 120 receives a first candidate level for a previous sample (n−1) and a second calculation block 120 receives a second candidate level 115. The candidate levels are multiplied by coefficients and then added to the fully equalized signal 105. The pre-calculation blocks output candidates of equalized signals 117 and 119, respectively, to single-level slicers 124. The single-level slicers 124 receive a threshold 121 based on indication of the region. The single-level slicers 124 output first compressed candidate 123 and second compressed candidates 125 to the look-ahead multiplexer 128 in the compressed domain 126.

For another example, in a double-tap partially unrolled DFE, there are four pre-calculation blocks 120, each receiving the fully equalized signal 105. In this embodiment, each pre-calculation block 120 receives two candidate levels. For example, the first pre-calculation block 120 receives the two candidate levels, Precalc0: Cand1_nm1, Cand1_nm2 and outputs a candidate 117 to a single-level slicer that outputs compressed candidate 123. The second pre-calculation block 120 receives the two candidate levels, Precalc1: Cand1_nm1, Cand2_nm2 and outputs a candidate 119 to a single-level slicer that outputs compressed candidate 125. A third pre-calculation block receives the two candidate levels, Precalc2: Cand2_nm1, Cand1_nm2) and outputs a candidate to a single-level slicer that outputs a compressed candidate (not illustrated in FIG. 1B). A fourth pre-calculation 120 receives the two candidate levels, Precalc3: Cand2_nm1, Cand2_nm2) and outputs a candidate 137 to a single-level slicer 124 that outputs a compressed candidate 127 to the look-ahead multiplexer 128.

As illustrated in FIG. 1B, the compressed domain 126 includes look-ahead multiplexers 128 and unrolling multiplexers 130. The look-ahead multiplexers 128 receives the compressed candidates from the single-level slicers 124 and output a compressed look-ahead candidates 129. The unrolling multiplexers 130 outputs the compressed sliced decisions 115 to the decompression circuit 122. The decompression circuit 122 outputs a symbol 113 (as a multi-bit output value).

Figures 2A, 2B, 2C:
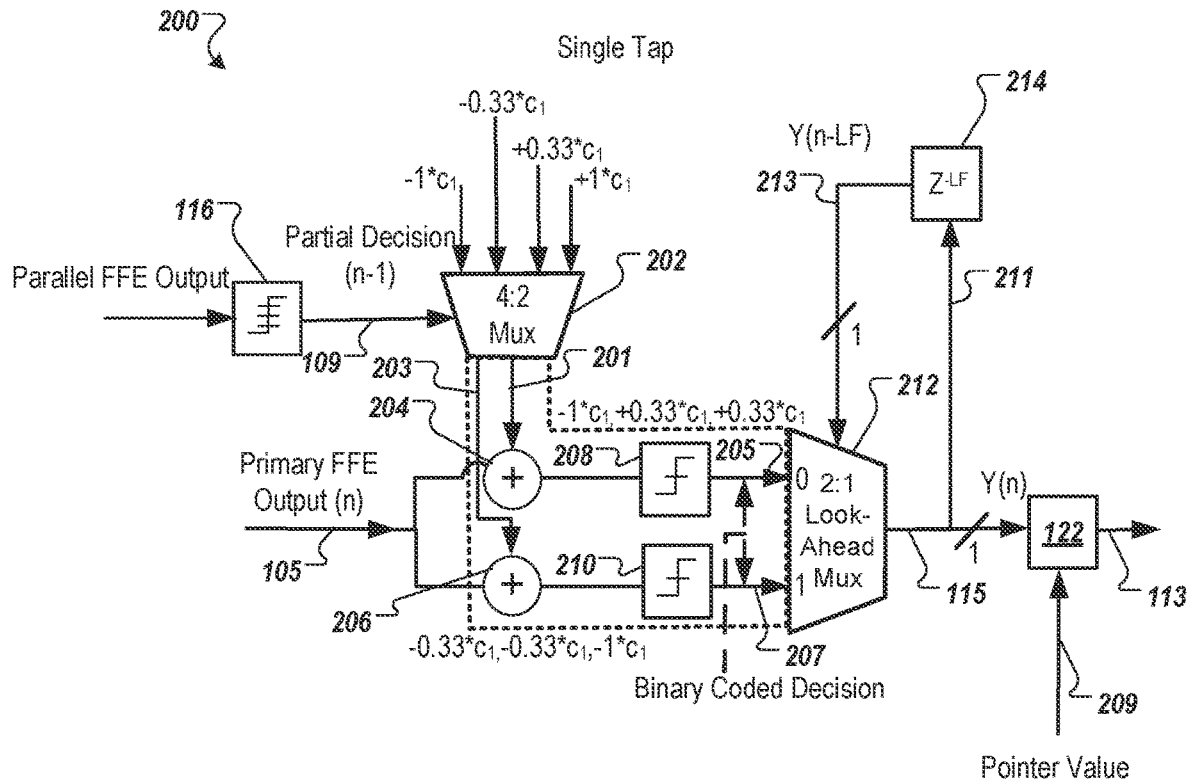
FIG. 2A is a block diagram of a partially unrolled DFE with a single tap and a 2:1 look-ahead multiplexer, according to at least one embodiment.
FIG. 2B shows a mapping of partial decisions, indications of PAM region levels, and multi-bit output values, according to at least one embodiment.
FIG. 2C shows a mapping of regions, candidates (binary), and pointer values, according to at least one embodiment.

FIG. 2A is a block diagram of a partially unrolled DFE 200 with a single tap and a 2:1 look-ahead multiplexer 212, according to at least one embodiment. The partially unrolled DFE 200 includes a multiplexer 202 (e.g., compression multiplexer) operatively coupled to an output of the PAMx slicer 116. As described above, the PAMx slicer 116 outputs the partially equalized PAMx symbol 109 (and error direction) associated with the previous sample (n−1). The multiplexer 202 outputs two uncompressed 2-bit (PAM4 case) symbol candidates 201, 203 which are multiplied by coefficients (not shown) and added to the primary FFE output.

In at least one embodiment, the partially unrolled DFE 200 includes a first adder 204 and a second adder 206. The first adder 204 can add a product of the first PAM4 candidate and a first tap weight (e.g., *b_dfe, where b_dfe is the dfe tap weight) to a primary FFE output value (e.g., primary FFE output signal 105) to obtain a first intermediate value (first intermediate signal). The second adder 206 can add a product of the second PAM4 candidate 203 and a second tap weight to the primary FFE output value (e.g., primary FFE output signal 105) to obtain a second intermediate value (second intermediate signal). The partially unrolled DFE 200 includes a first single-level slicer 208 and a second single-level slicer 210. The first single-level slicer 208 can receive the first intermediate value and output a third intermediate value. The second single-level slicer 210 can receive the second intermediate value and output a fourth intermediate value. The third intermediate and fourth intermediate values, which are compressed candidates, are part of a binary-coded decision fed to the look-ahead multiplexer 212. In at least one embodiment, the third intermediate value is a first of the two symbol candidates, and the fourth intermediate value is a second of the two symbol candidates. In at least one embodiment, the first compressed candidate 205 and the second compressed candidate 207 can be a minimum or a minimum plus one, depending on the result of the single-level slicers 208, 210. In at least one embodiment, the look-ahead multiplexer 212 can receive the third intermediate and fourth intermediate values and output a 1-bit output value (compressed decisions 115) associated with the current sample. In at least one embodiment, the decompression circuit 122 includes a third adder to add a pointer value 209 to the 1-bit output value (compressed decisions 115) to obtain a multi-bit output value (e.g., decision 133). The 1-bit output value is expressed as Y(n) for a current sample, and the pointer value 209 can be a minimum value corresponding to the identified region. In at least one embodiment, the look-ahead multiplexer 212 is controlled by a prior symbol decision by the partially unrolled DFE 200. In at least one embodiment, the partially unrolled DFE 200 includes a delay element 214 that can receive and delay the 1-bit compressed output value of a previous sample to obtain a delayed compressed output value 213, delay the bit 211, and output the delayed bit 213 as a control signal representing the decision of a previous sample. The delayed bit 213 can be expressed as follows: Y(n−1).

As described above, partially unrolled DFE 200 can equalize the primary FFE output by removing the ISI of n post-cursor taps and slicing the result. FIG. 2B shows a mapping 220 of partial decisions 222, an indication of PAM region levels 224 (S), and multi-bit output values 226, according to at least one embodiment. FIG. 2C shows a mapping 240 of regions 242, candidates 244 (binary), and pointer values 246, according to at least one embodiment. As shown in mapping 220, there are three regions 228, 230, and 232. As shown in mapping 240, the three regions 242 map to three pointer values 246. The pointer value 246 for a particular region is stored and added to the 1-bit output value 115 by the decompression circuit 122 to obtain the multi-bit output value of decision 133. Additional details of the three regions are described below with respect to FIG. 3A-3C.

FIG. 3A is a block diagram of a look-ahead multiplexer 302 and an adder 304 that adds a pointer value to transform a single-bit value into a multi-bit output value according to a PAM region level, according to at least one embodiment. In at least one embodiment, the look-ahead multiplexer 302 is any of the multiplexers described above of the partially unrolled DFEs described above. The look-ahead multiplexer 302 can receive a first candidate 301 (candidate 0) and a second candidate 303 (candidate 1). The look-ahead multiplexer 302 is controlled by a single-bit multiplexer output 305 corresponding to a prior symbol. The look-ahead multiplexer 302 can select one of the two candidates as an intermediate value 307 (e.g., dfe_tmp_n) of a current sample. The adder 304 can receive the intermediate value 307 and a pointer value 309 (e.g., region_min_n[1:0]). The adder 304 can add the pointer value 309 to the intermediate value 307 to obtain a multi-bit output value 311 (e.g., dfe_out_n[1:0]). As described above and illustrated in FIG. 3B, the pointer value 309 can correspond to a minimum value of a respective region.

FIG. 3B is a graph 310 of a probability density function (PDF) of a parallel FFE output across three regions according to at least one embodiment. The parallel FFE output spans across a first region 312, a second region 314, and a third region 316. A first boundary 313 between the first region 312 and second region 314 can be set at −0.33 volts. A second boundary 315 between the second region 314 and third region 316 can be set at +0.33 volts. The pointer value for the first region 312 can be set at a minimum value of 00 for the symbol in the first region 312. The pointer value for the second region 314 can be set at a minimum value of 01 for the symbol in the second region 314. The pointer value for the third region 316 can be set at a minimum value of 10 for the symbol in the second region 314.

FIG. 3C is a graph 320 of a cumulative distribution function (CDF) 322 of a given symbol according to at least one embodiment. The given symbol in graph 320 is the 0.33 symbol. Graph 320 also shows a lower decision threshold 324 at zero volts and a boundary 326 between the first region 312 and second region 314 (same as the first boundary 313 in FIG. 3B).

As described above, the secondary FFE 114 can determine the indication 111 of the PAM level region based on statistics to disqualify most candidates, compressing the multi-level signaling to single-bit signaling (NRZ signaling) for selecting one of the two candidates as a single-bit binary-coded decision. The selected candidate can be decompressed to the multi-bit output value using the pointer value described above. This reduces the multiplexer tree of a partially unrolled DFE significantly. By storing the indication 111 of the PAM level region for every sample, the speculations driven into the look-ahead and unrolling multiplexers can be coded with 1 bit: 0 for candidate equal to the minimum symbol and 1 for minimum symbol +1. This can lead to significant savings in the multiplexers needed for the look-ahead and unrolling. Instead of multiplexing 2×2 bit symbols, one only needs to multiplex 2×1 bit symbols. As described above, the partially unrolled DFE 200 can be shared for both PAM4 and NRZ signaling with a selectable reference slicer. As described above, this technique can be used for any number of PAM levels and any number of DFE tap levels, such as illustrated in the two-tap DFE in FIGS. 4A-4B.

Figure 4A:
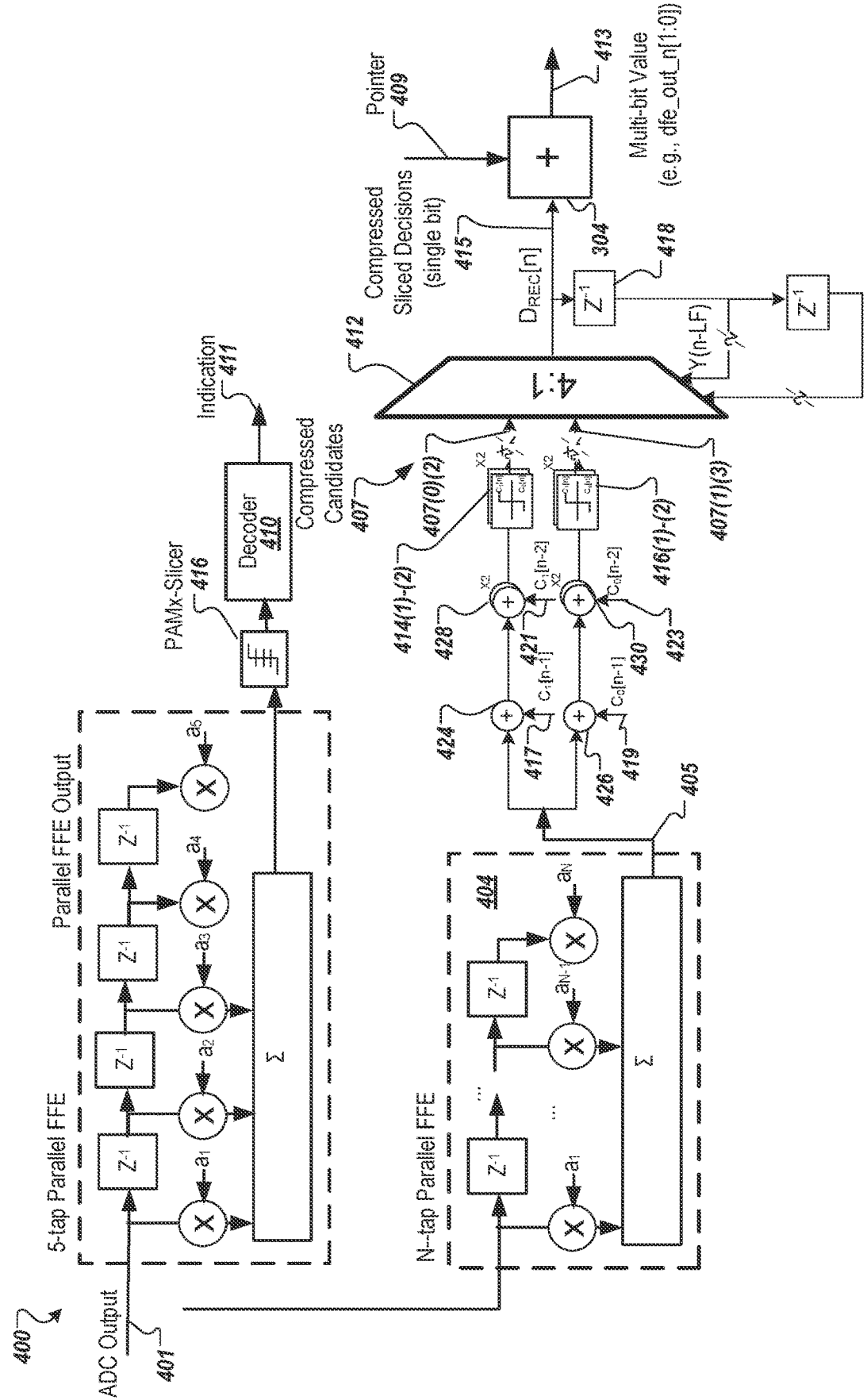
FIG. 4A is a block diagram of a digital processing circuit that implements a 5-tap parallel FFE, an N-tap parallel FFE, and a two-tap partially unrolled DFE without look-ahead multiplexers, according to at least one embodiment.

FIG. 4A is a block diagram of a digital processing circuit 400 that implements a 5-tap parallel FFE 402, an N-tap parallel FFE 404, and a two-tap partially unrolled DFE 406 without look-ahead multiplexers, according to at least one embodiment. In at least one embodiment, the digital processing circuit 400 is a digital signal processor (DSP) coupled to the ADC. The ADC has multiple processing blocks that implement the 5-tap parallel FFE 402, N-tap parallel FFE 404, and two-tap partially unrolled DFE 406.

The 5-tap parallel FFE 402 can be used to determine a partially equalized symbol and a region where an actual symbol can exist based on statistics described herein. In at least one embodiment, the 5-tap parallel FFE 402 receives samples 401 from an ADC (not illustrated). The ADC can receive an incoming signal and generate multiple samples according to a PAM scheme (PAM4 illustrated in FIG. 4). The 5-tap parallel FFE 402 outputs a signal to a PAMx slicer 416 that outputs a partial decision, including a partially equalized symbol and error detection. The partial decision is used by the two-tap partially unrolled DFE 406 to determine a region and a threshold used by the single-level slicers. In at least one embodiment, the 5-tap parallel FFE 402 includes five taps, four delay elements, and a summer. In another embodiment, additional taps can generate the signal to be sliced by slicer 408.

In at least one embodiment, the N-tap parallel FFE 404 also receives the samples 401 from the ADC and outputs a signal 405 to the two-tap partially unrolled DFE 406. The N-tap parallel FFE 404 has more taps than the 5-tap parallel FFE 402 and provides a fully equalized signal that is more equalized than the partially equalized signal produced by the 5-tap parallel FFE 402.

In at least one embodiment, the two-tap partially unrolled DFE 406 can include circuitry to compress the multi-level signal to a single-bit signal and transform the single-bit signal's decision to a multi-bit output value using a pointer value 409 stored in response to the region detected. The two-tap partially unrolled DFE 406 receives the signal 405 from the N-tap parallel FFE 404. The two taps of the two-tap partially unrolled DFE 406 add signals to two candidates of the signal 405 before being sliced by single-level slicers 414(1)-(2), 416(1)-(2) to obtain four speculated symbol candidates 407(0), 407(1), 407(2), 407(3), as a binary-coded decision for the look-ahead multiplexer 412. The signals being added are the product of the candidate levels and the corresponding coefficients, as described herein. The look-ahead multiplexer 412 selects one of the four speculated symbol candidates 407(0), 407(1), 407(2), and 407(3) as output value 415 (single bit value). The look-ahead multiplexer 412 receives two control signals to select the compressed sliced decision 415. The output value 415 can be provided to the adder 304 and a delay element 418. An output of the delay element 418 can control the look-ahead multiplexer 412 for subsequent symbols. For the current symbol, the look-ahead multiplexer 412 is controlled by a previous decision of a previous symbol.

Figure 4B:
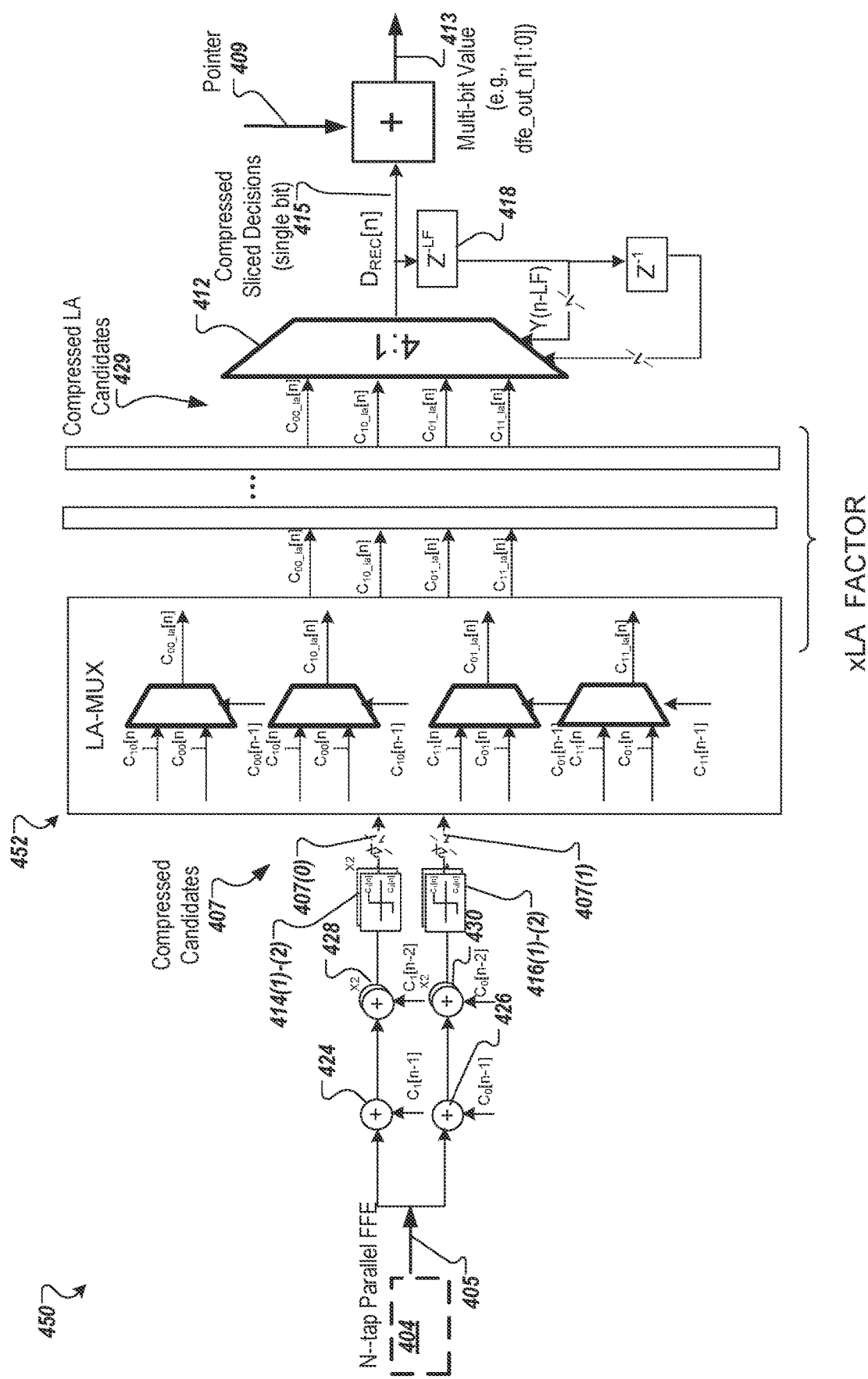
FIG. 4B is a block diagram of a digital processing circuit that implements a 5-tap parallel FFE, an N-tap parallel FFE, and a two-tap partially unrolled DFE with look-ahead multiplexers, according to at least one embodiment.

In at least one embodiment, the 5-tap parallel FFE 402 can output a first value associated with a current sample of the samples 401. A PAMx slicer 416 receives the parallel FFE output from the 5-tap parallel FFE 402 and outputs a partially equalized sliced symbol and an error direction to the decoder 410. The decoder 410 can output an indication 411 of a PAM level region in which the fully equalized symbol is highly probable to be located. As described herein, the indication 411 can specify the region (such as a minimum level of a region) and a threshold used by the single-level slicers. For each tap, the candidates associated with the region are multiplied by the DFE coefficient and added (424/428, 426 and 430) to the second value associated with a current sample output by the primary N-tap parallel FFE 404, then driven to the slicer. The slicer is a single slicer with only two possible results, hence the two results can be coded with a single bit. The two-tap partially unrolled DFE 406 has multiplexers with two 1-bit inputs and one 1-bit output and decompression circuitry to transform a 1-bit output value into a multi-bit output value adding a pointer value associated with the PAM level region within the PAM scheme. A first multiplexer (e.g., look-ahead multiplexer 412) of the multiple multiplexers is illustrated in FIGS. 4A-4B. The first multiplexer receives two signals/values corresponding to two candidates of the current symbol for a single-tap partially unrolled DFE and four signals/values corresponding to four candidates of the current symbol for a double-tap partially unrolled DFE. The first multiplexer is controlled by a 1-bit output value associated with a previous sample for a single-tap partially unrolled DFE and two 1-bit output values associated with a previous sample. The decompression circuitry can include adder 304 that adds a pointer value 409 to the 1-bit output value 415 to obtain the multi-bit output value corresponding to a current symbol decision 413. The two-tap partially unrolled DFE 406 can determine a decision of the current sample using the partial decision and the primary FFE output value (e.g., signal 405).

In at least one embodiment, the two-tap partially unrolled DFE 406 generates two candidates 417, 419 based on the partially equalized sliced signal associated with the previous sample. A first adder 424 adds a product of the first candidate 417 and a first tap weight to the primary FFE output value 405 to obtain a first intermediate value. the 2-bit candidates selected by the region are multiplied by the tap coefficients to obtain A second adder 426 adds a product of the second candidate 419 and a second tap weight to the primary FFE output value 405 to obtain a second intermediate value. A second multiplexer can output a first candidate 421 and a second candidate 423 based on the speculated sliced symbol associated with a second previous sample. A third adder 428 can add the first candidate 421 to the first intermediate value to obtain a third intermediate value. A fourth adder 430 can add the second candidate 423 to the second intermediate value to obtain a fourth intermediate value. The third and fourth intermediate values are provided to slicers 414, 416, respectively. The first single-level slicer 414 receives the third intermediate value and outputs a fifth intermediate value, and the second single-level slicer 416 receives the fourth intermediate value and outputs a sixth intermediate value. The fifth and sixth intermediate values are the binary-coded decision for the look-ahead multiplexer. The look-ahead multiplexer selects one of the two candidates based on the previous symbol described above.

In at least one embodiment, the DFE includes a set of multiplexers having two 1-bit inputs and one 1-bit output. In at least one embodiment, the number of multiplexers in the set is defined by the following equation (1) above. In at least one embodiment, the PAM scheme includes other PAM levels than four (e.g., two or more levels), and the two-tap partially unrolled DFE 406 includes different numbers of taps (e.g., one or more taps).

As described above, FIG. 4A, the fully equalized sliced symbol (e.g., two-tap partially unrolled DFE) does not have multiple look-ahead multiplexers. In other embodiments, the two-tap partially unrolled DFE can include multiple look-ahead (LA) multiplexers for a look-ahead factor of x, where x represents a number of LA multiplexer (e.g., xLA_Factor).

FIG. 4B is a block diagram of a digital processing circuit 450 that implements a 5-tap parallel FFE, an N-tap parallel FFE, and a two-tap partially unrolled DFE with look-ahead multiplexers, according to at least one embodiment. The digital processing circuit 450 is similar to the digital processing circuit 400, except the digital processing circuit 450 includes x number of LA multiplexer stages 452 coupled between the single-level slicers 414(1)-(2), 416(1)-(2), and the first multiplexer 412.

Figure 5:
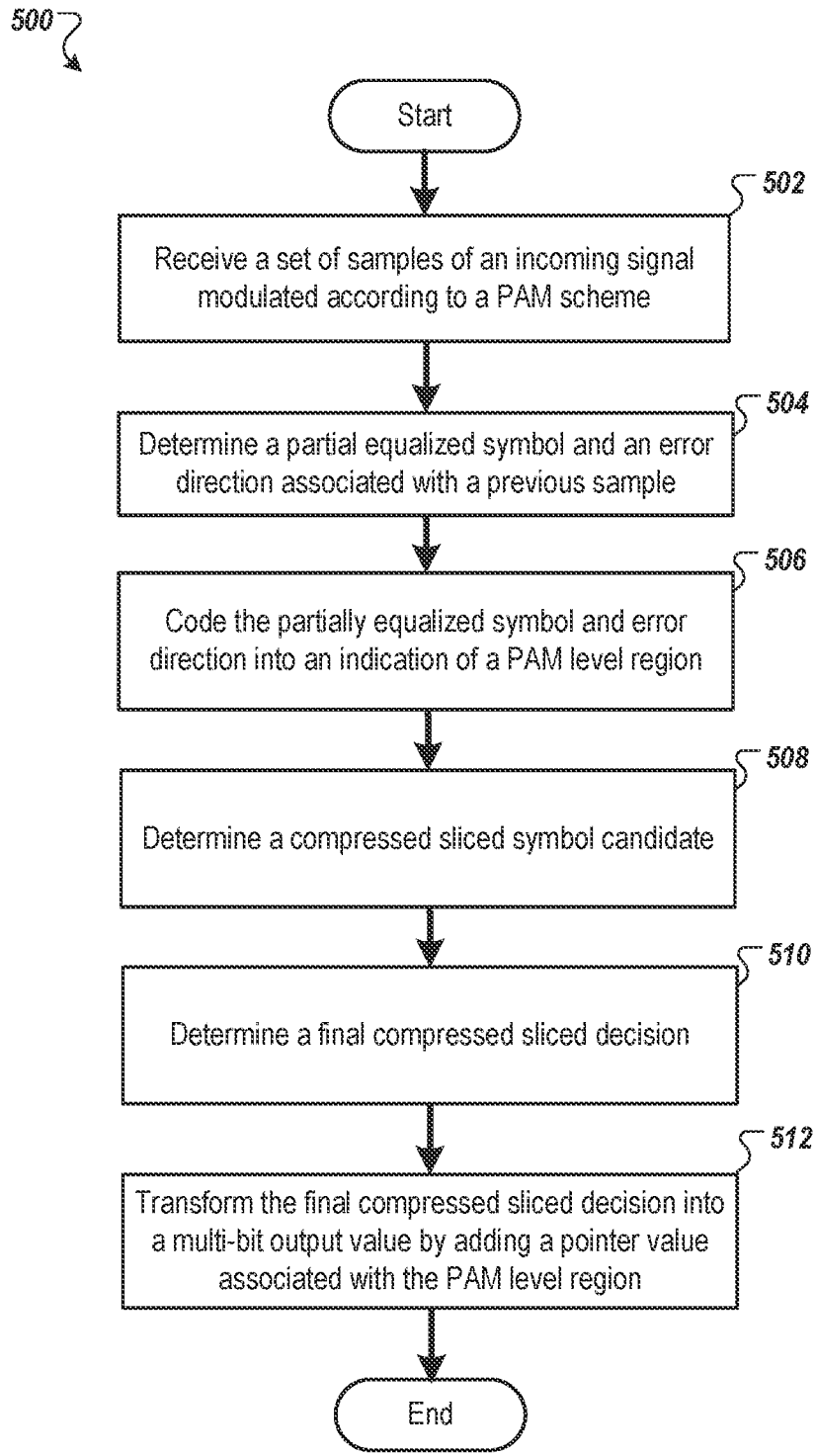
FIG. 5 is a flow diagram of a method of operating an integrated circuit for multi-level signaling compression associated with partially unrolled DFE, according to at least one embodiment.

FIG. 5 is a flow diagram of a method 500 of operating an integrated circuit for multi-level signaling compression associated with partially unrolled DFE, according to at least one embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by the receiver 100 of FIG. 1A. In another embodiment, the digital signal processing circuit performs the method 500. In another embodiment, a DSP performs the method 500.

Referring to FIG. 5, the method 500 begins with the processing logic receiving a set of samples of an incoming signal modulated according to a PAM scheme (block 502). The processing logic determines a partially equalized symbol and error direction associated with a previous sample (block 504). The processing logic codes the partially equalized symbol and the error direction as an indication of a PAM level region (block 506). The processing logic (partially unrolled DFE) can determine a compressed sliced decision using the indication of the PAM level region (block 508). The processing logic can use a minimum level of a region and a threshold level for the single-level slicer for the specified region. For example, the PAM level region is a region in which an actual symbol is in, and two 1-bit compressed candidates of a current symbol (e.g., a binary-coded signal or binary-coded decision) can be used to determine a final compressed sliced decision. From the two 1-bit compressed candidates, the processing logic can determine the final compressed sliced decision (block 510). The processing logic transforms the final compressed sliced decision into a multi-bit output value by adding a pointer value associated with the PAM level region within the PAM scheme (block 512).

In a further embodiment, the processing logic determines, using a first FFE, a secondary FFE output value associated with the previous sample. Using a multi-level slicer, the processing logic determines the partial decision based on the secondary FFE output value. Using a second FFE, the processing logic determines a primary FFE output value associated with the current sample. In at least one embodiment, the processing logic determines the compressed sliced decision by a partially unrolled DFE determining a compressed sliced decision of the current sample using the partial decision. The processing logic transforms compressed sliced decision into the multi-bit output value by adding the pointer value to the compressed sliced decision.

In another embodiment, the processing logic generates, by the partially unrolled DFE, two candidates based on the partially equalized sliced symbol associated with the previous sample. The processing logic adds a product of the first candidate and a first tap weight to the primary FFE output value to obtain a first intermediate value and adds a product of the second candidate and a second tap weight to the primary FFE output value to obtain a second intermediate value. Using a first single-level slicer, the processing logic generates a third intermediate value based on the first intermediate value. Using a second single-level slicer, the processing logic generates a fourth intermediate value based on the second intermediate value. In at least one embodiment, the processing logic determines the compressed sliced decision by selecting, by a multiplexer, a 1-bit output value from the third intermediate value and the fourth intermediate value. The 1-bit output value is the decision of the current sample. In at least one embodiment, the processing logic transforms the compressed sliced decision into the multi-bit output value by adding the pointer value to the 1-bit output value to obtain the multi-bit output value.

In another embodiment, the processing logic receives a plurality of samples of an incoming signal modulated according to a PAM scheme. The processing logic determines a partial decision associated with a previous sample. The partial decision comprises a partially equalized symbol and an error direction. The processing logic determines an indication of a PAM level region of the partially equalized symbol. The processing logic determines a number of compressed candidates using a threshold of the pam level region. The processing logic generates a DFE output based on an equalized signal corresponding to the incoming signal using the number of compressed candidates. The processing logic transforms the DFE output into a multi-bit output value by adding a pointer value associated with the pam level region within the PAM scheme.

In a further embodiment, the processing logic determines, by a first FFE a secondary FFE output value. The processing logic determines, by a multi-level slicer, the partial decision based on the secondary FFE output value. The processing logic determines, by a second FFE, a primary FFE output value associated with a current sample. In at least one embodiment, the processing logic determines the DFE output by determining, by a partially unrolled DFE, a compressed sliced decision of the current sample using the number of compressed candidates. The processing logic can transform the symbol candidate into the multi-bit output value by adding the pointer value to the compressed sliced decision to obtain the multi-bit output value.

In a further embodiment, the processing logic generates, by the partially unrolled DFE, a first candidate and a second candidate based on the partially equalized symbol. The processing logic adds, by the partially unrolled DFE, a product of the first candidate and a first tap weight to the primary FFE output value to obtain a first intermediate value. The processing logic adds, by the partially unrolled DFE, a product of the second candidate and a second tap weight to the primary FFE output value to obtain a second intermediate value. The processing logic generates, by a first single-level slicer, a third intermediate value based on the first intermediate value. The processing logic generates, by a second single-level slicer, a fourth intermediate value based on the second intermediate value. The processing logic determines the DFE output by selecting, by a multiplexer, a 1-bit output value from the third intermediate value and the fourth intermediate value. The 1-bit output value is the DFE output of the current sample. The processing logic transforms the DFE output into the multi-bit output value by adding the pointer value to the 1-bit output value to obtain the multi-bit output value.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatuses. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A receiver comprising:
   a sampling circuit configured to generate a plurality of samples of an incoming signal modulated according to a pulse-amplitude modulation (PAM) scheme; and
   a digital processing circuit coupled to the sampling circuit, wherein the digital processing circuit comprises:
      a partially unrolled decision feedback equalizer (DFE), wherein the partially unrolled DFE comprises a first multiplexers having two 1-bit inputs and one 1-bit output and a second multiplexer coupled to the first multiplexer, wherein the partially unrolled DFE is configured to determine a 1-bit output value; and
      decompression circuitry configured to determine a PAM level region in which an actual symbol is located and transform the 1-bit output value into a multi-bit output value by adding a pointer value associated with the PAM level region within the PAM scheme.

2. The receiver of claim 1, further comprising:
   a first feed-forward equalizer (FFE), the first FFE configured to receive the plurality of samples and output a secondary FFE output value;
   a multi-level slicer coupled to the first FFE, the multi-level slicer configured to output a partial decision based on the secondary FFE output value, wherein the partial decision comprises a partially equalized symbol and an error direction;
   a decoder coupled to the multi-level slicer, the decoder configured to determine an indication of the PAM level region of the partially equalized symbol; and
   a second FFE configured to receive the plurality of samples and output a primary FFE output value associated with a current sample, wherein the partially unrolled DFE is configured to output the 1-bit output value of the current sample using the partial decision and the primary FFE output value.

3. The receiver of claim 1, wherein:
the PAM scheme comprises two or more levels; and
the partially unrolled DFE comprises one or more taps.

4. The receiver of claim 1, wherein:
the PAM scheme comprises four levels; and
the partially unrolled DFE comprises one tap.

5. The receiver of claim 1, wherein the partially unrolled DFE is a parallel DFE with a specified timing path to process P samples in parallel in a word clock domain, where P is a positive integer greater than two.

6. The receiver of claim 5, wherein the parallel DFE, to meet the specified timing path, comprises a pre-calculation stage, a look-ahead stage, and an unrolling stage, wherein the look-ahead stage is to select a compressed look-ahead candidate of a current sample based on a partially equalized symbol of a previous sample, wherein the unrolling stage is to select a compressed sliced symbol of the current sample.

7. The receiver of claim 6, wherein the pre-calculation stage is to calculate and slice a fully equalized signal based on speculations of N^K possibilities, where N is a number of PAM levels in the PAM scheme, and K is a number of taps of the parallel DFE.

8. The receiver of claim 6, further comprising a first feed-forward equalizer (FFE) configured to receive the plurality of samples and output the partially equalized symbol of the previous sample and an error direction, wherein an indication of the PAM level region in which an actual sliced symbol is located is determined based on the partially equalized symbol and the error direction.

9. The receiver of claim 8, wherein a number of the first and second multiplexers is set forth in the following equation:

$$1*P*\left(\frac{(L-1)*2^N}{2} + \sum_{i=0}^{N-1} 2^i\right)$$

where P represents a number of parallel lines, L represents a look-ahead factor, and N represents a number of taps of the partially unrolled DFE.

10. A method comprising:
receiving, by a processing device, a plurality of samples of an incoming signal modulated according to a pulse-amplitude modulation (PAM) scheme;
determining, by the processing device, a partial decision associated with a previous sample, wherein the partial decision comprises a partially equalized symbol and an error direction;
determining, by the processing device, an indication of a PAM level region of the partially equalized symbol;
determining, by the processing device, a number of compressed candidates using a threshold of the PAM level region;
generating, by the processing device, a DFE output based on an equalized signal corresponding to the incoming signal using the number of compressed candidates; and
transforming, by the processing device, the DFE output into a multi-bit output value by adding a pointer value associated with the PAM level region within the PAM scheme.

11. The method of claim 10, further comprising:
determining, by a first feed-forward equalizer (FFE) of the processing device, a secondary FFE output value;
determining, by a multi-level slicer of the processing device, the partial decision based on the secondary FFE output value; and
determining, by a second FFE of the processing device, a primary FFE output value associated with a current sample, wherein:
generating the DFE output comprises determining, by a partially unrolled decision feedback equalizer (DFE) of the processing device, a compressed sliced decision of the current sample using the number of compressed candidates; and
transforming the DFE output into the multi-bit output value comprises adding the pointer value to the compressed sliced decision to obtain the multi-bit output value.

12. A system comprising:
an analog-to-digital converter (ADC) configured to receive an incoming signal and generate a plurality of samples according to a pulse-amplitude modulation (PAM) scheme; and
a digital signal processor (DSP) coupled to the ADC, wherein the DSP comprises a plurality of processing blocks comprising:
a first feed-forward equalizer (FFE) configured to output a first value associated with a previous sample of the plurality of samples;
a multi-level slicer configured to output a partially equalized symbol based on the first value and an error direction;
a decoder configured to determine an indication of a PAM level region in which an actual symbol is located based on the first value and the error direction;
a second FFE configured to output a second value associated with a current sample;
a decision feedback equalizer (DFE) comprising a plurality of multiplexers having two 1-bit inputs and one 1-bit output; and
decompression circuitry configured to transform a 1-bit output value into a multi-bit output value by adding a pointer value associated with the PAM level region within the PAM scheme, wherein the decoder comprises a multiplexer coupled to the multi-level slicer, and configured to output a first candidate and a second candidate based on the partially equalized symbol.

13. The system of claim 12, wherein the plurality of multiplexers each having two 1-bit inputs and one 1-bit output, wherein a number of the plurality of multiplexers is set forth in the following equation:

$$1*P*\left(\frac{(L-1)*2^N}{2} + \sum_{i=0}^{N-1} 2^i\right)$$

where P represents a number of parallel lines, L represents a look-ahead factor, and N represents a number of taps of the DFE.

* * * * *